April 14, 1953   C. E. FULLER ET AL   2,634,738
BEARING WASHER
Filed Dec. 27, 1948

INVENTOR.
CHARLES E. FULLER
THOMAS J. SEDLAK
BY
C. Lauren Maloby
ATTORNEY

Patented Apr. 14, 1953

2,634,738

UNITED STATES PATENT OFFICE 2,634,738

BEARING WASHER

Charles E. Fuller and Thomas J. Sedlak,
Los Angeles, Calif.

Application December 27, 1948, Serial No. 67,444

2 Claims. (Cl. 134—169)

This invention relates to machinery cleaning equipment and more specially to a bearing washer.

An object of the invention is to provide a simple, practical and inexpensive bearing washer of the character described.

Another object of the invention is to provide a novel and efficient device for washing and cleaning bearings used in automobiles and other machines.

A further object of the invention is to provide a bearing washer of the character described, capable of washing bearings having a considerable range in size.

Another object of the invention is to provide a novel bearing washer adapted to accommodate a plurality of bearings at the same time, which bearings may be of differing size or shape.

Another object of the invention is to provide a device of the character described wherein bearings may be washed in a suitable washing solution wherein the solution is not contacted by the hands of the operator.

Other objects and advantages will appear and be brought out more fully in the following specification, reference being had to the accompanying drawing wherein.

Figures 1, 2:
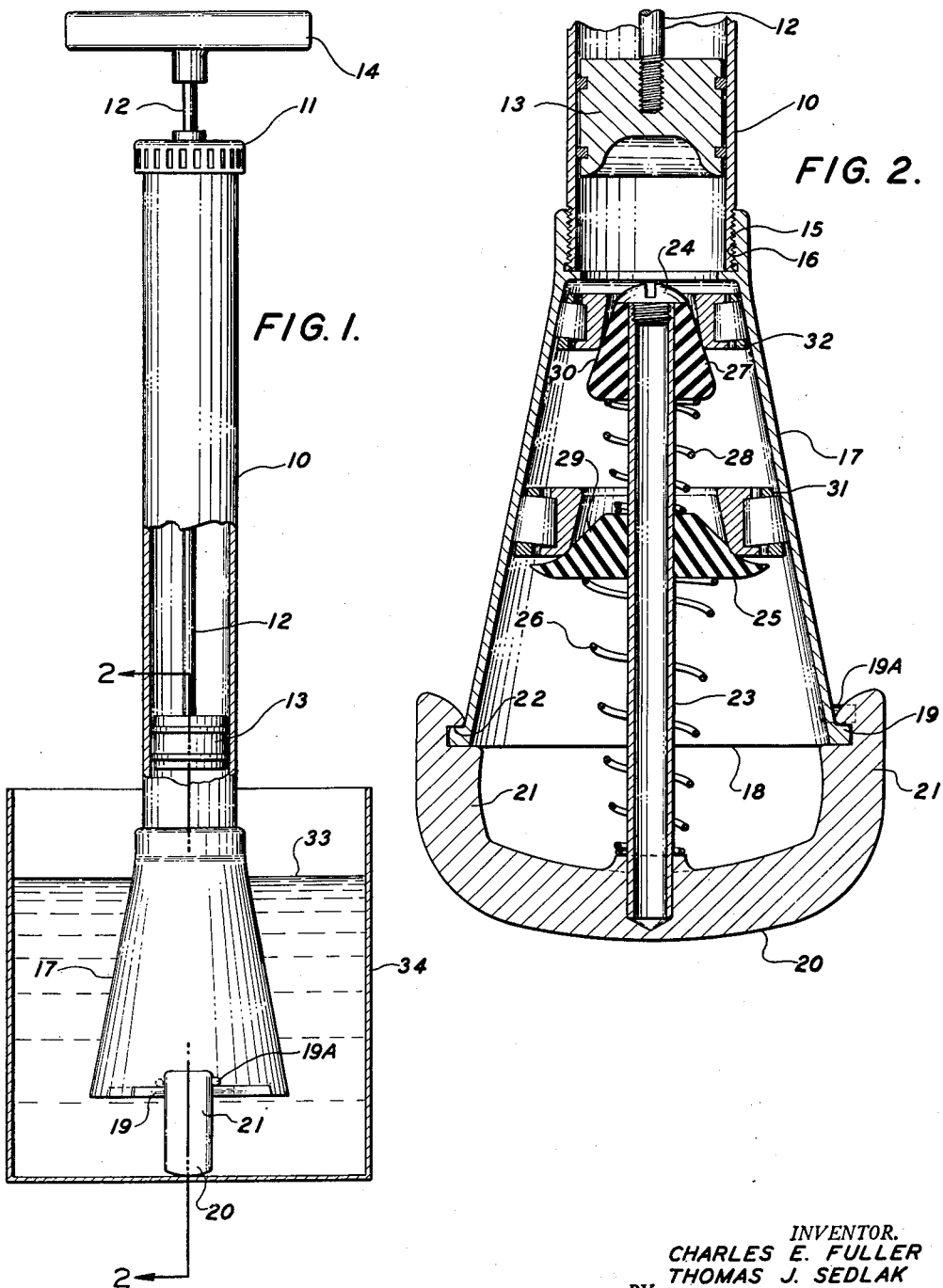
Fig. 1 is a side view, partly broken away, of an embodiment of my invention.
Fig. 2 is a partial sectional view, enlarged, showing the major features of the invention.

Referring more particularly to the drawing, we show a bearing washer comprising an elongated tube 10 having a plunger guide collar 11 at one end for guiding a plunger rod 12 to which is secured a plunger piston 13, the rod having a handle 14 at its outer end. Tube 10 has threaded end portion 15 by which it is secured to the threaded annular portion 16 of a cone shaped bearing retainer 17.

Retainer 17 has a rim 18 at its larger diameter end and a pair of flanges 19 for engagement with a yoke 20 which is formed with a pair of yoke arms 21, each having a shouldered groove 22 for engagement with flanges 19. Flanges 19 have a high spot near a stop pin 19a.

A rod or tube 23 extends into cone 17 from yoke 20 and has a shouldered screw or rivet 24 at its outer end. A collar or button 25 is slidably mounted on tube 23 and is seated on a helical spring 26, the other end of which bears against yoke 20. A collar or button 27 is similarly slidably mounted on tube 23 and is seated on a helical or straight spring 28, the other end of which bears against button 25. Button 25 may have a tapered formation 29 and button 27 may have a tapered formation 30 for engaging and retaining bearing races 31 and 32 as shown.

Buttons 25 and 27 may be of any suitable material such as rubber, plastic or the like, having some degree of resiliency such that they will not mar the bearing surfaces of the bearing races and such as to resist deterioration from the washing solution.

The operation of the invention should be apparent from the foregoing description. The bearings, such as bearings 31 and 32, are placed in the conical retainer 17 and the button and clamp unit positioned as shown in Fig. 2, and the yoke secured by a turning movement to effect engagement of flanges 19 and grooves 22. The bearings will thus be held by their spring seats in substantially the position shown. The washer is then placed in a washing solution 33 in a suitable pan 34 or the like, and the plunger actuated by pumping action. This action will draw the washing solution upwardly into tube 10 and downwardly therefrom, and this action carries the solution through the bearing races 31 and 32 in such manner as to thoroughly and completely dislodge any dirt or foreign matter which may have accumulated in the bearing races or on the bearing roller elements, whether balls or rollers.

The bearing washer of our invention is capable of handling bearings of different sizes and shapes. It can handle cylindrical as well as conical bearings, both of the roller type and the ball type. Also, it will handle two bearings at a time and is particularly adapted to handle both bearings of an automobile wheel, one of which is usually larger than the other. Also, in the operation of the invention it is never necessary for the cleaning fluid to come in contact with the hands of the operator since the entire washing operation is plunger operated.

While we have shown and described a preferred embodiment of our invention, it will be understood that this is illustrative rather than restrictive of our invention, and that changes and modifications may be made without departing from the spirit and scope of the subjoined claims.

Having described our invention what we claim is:

1. A washer for roller bearings as described, comprising in combination a plunger tube having a plunger, a conical bearing retainer secured at its smaller end to said tube and having its other end open and means to hold a plurality of roller bearing races in said retainer, said means including a yoke, a rod secured to said yoke and extending into the open end of said retainer and a pair of spring seated buttons slidable coaxially on said rod each adapted to engage and secure by spring pressure a roller bearing race in said retainer whereby said plunger may cause a surge flow of washing solution past said races when said retainer is immersed in such solution.

2. A washer for roller bearings as described, comprising in combination a plunger tube having a plunger, a conical bearing retainer secured at its smaller end to said tube and having its other end open and means to hold a plurality of roller bearing races in said retainer, said means including a yoke, a rod secured to said yoke and extending into the open end of said retainer and a pair of spring seated buttons slidable coaxially on said rod each adapted to engage and secure by spring pressure a roller bearing race in said retainer, one of said buttons being spring seated on the other button whereby said plunger may cause a surge flow of washing solution past said races when said retainer is immersed in such solution.

CHARLES E. FULLER.
THOMAS J. SEDLAK.

References Cited in the file of this patent

UNITED STATES PATENTS

| Number | Name | Date |
|---|---|---|
| 1,496,104 | Selden | June 3, 1924 |
| 1,623,363 | Schwanke | Apr. 5, 1927 |
| 1,666,186 | Tong | Apr. 17, 1928 |
| 1,991,542 | Cavanaugh | Feb. 19, 1935 |
| 2,103,699 | Sheehan | Dec. 28, 1937 |
| 2,137,660 | Welke | Nov. 22, 1938 |
| 2,168,746 | Saal et al. | Aug. 8, 1939 |
| 2,309,820 | Berg | Feb. 2, 1943 |
| 2,536,129 | Heaney | Jan. 2, 1951 |